(12) United States Patent
Chen et al.

(10) Patent No.: US 9,458,796 B2
(45) Date of Patent: Oct. 4, 2016

(54) DUAL-VORTICAL-FLOW HYBRID ROCKET ENGINE

(71) Applicants: National Applied Research Laboratories, Taipei (TW); National Chiao Tung University, Hsinchu (TW)

(72) Inventors: Yen-Sen Chen, Zhubei (TW); Men-Zen Wu, Taipei (TW); Jong-Shinn Wu, Hsinchu (TW); Alfred Lai, Kaohsiung (TW); Jhe-Wei Lin, Taipei (TW); Tzu-Hao Chou, New Taipei (TW)

(73) Assignees: National Applied Research Laboratories, Taipei (TW); National Chiao Tung University, Hsinchu (TW)

( * ) Notice: Subject to any disclaimer, the term of this patent is extended or adjusted under 35 U.S.C. 154(b) by 684 days.

(21) Appl. No.: 14/070,881

(22) Filed: Nov. 4, 2013

(65) Prior Publication Data

US 2014/0352276 A1    Dec. 4, 2014

(30) Foreign Application Priority Data

May 31, 2013    (TW) .............................. 102119323 A

(51) Int. Cl.
    F02K 9/72    (2006.01)
(52) U.S. Cl.
    CPC ............. F02K 9/72 (2013.01); *F05D 2210/33* (2013.01); *F05D 2240/35* (2013.01)
(58) Field of Classification Search
    CPC .. F02K 9/72; F05D 2240/35; F05D 2210/33; F23R 2900/03341; F23R 2900/34; F23R 2900/46; F23R 2900/12
    See application file for complete search history.

(56) References Cited

U.S. PATENT DOCUMENTS

| | | | | |
|---|---|---|---|---|
| 2,286,909 A * | 6/1942 | Goddard | ................... | F02K 9/52 431/173 |
| 3,065,596 A * | 11/1962 | Schultz | ..................... | F02K 9/94 149/2 |
| 3,158,997 A * | 12/1964 | Blackman | ................. | F02K 9/72 60/251 |
| 3,426,534 A * | 2/1969 | Murphy | .................... | F02K 9/50 137/13 |
| 4,811,556 A * | 3/1989 | Lau | ........................... | F02K 7/14 60/206 |
| 4,817,890 A * | 4/1989 | Coffinberry | ............ | F02K 9/605 244/135 R |
| 4,835,959 A * | 6/1989 | Coffinberry | .............. | F02K 7/14 60/206 |
| 4,840,025 A * | 6/1989 | Coffinberry | .............. | F02K 9/64 102/289 |
| 4,841,723 A * | 6/1989 | Lau | .......................... | F02K 9/68 60/204 |
| 4,928,481 A * | 5/1990 | Joshi | ....................... | F23R 3/346 60/737 |
| 6,601,380 B2 * | 8/2003 | Knuth | ....................... | F02K 9/52 60/219 |
| 6,865,878 B2 * | 3/2005 | Knuth | ....................... | F02K 9/52 60/258 |
| 2004/0216463 A1 * | 11/2004 | Harris | ..................... | F23R 3/045 60/776 |

* cited by examiner

*Primary Examiner* — Carlos A Rivera
(74) *Attorney, Agent, or Firm* — Birch, Stewart, Kolasch & Birch, LLP

(57) ABSTRACT

The present invention discloses a dual-vortical-flow hybrid rocket engine, including a main body and a nozzle communicating with an end of the main body. The main body includes a plurality of disk-like combustion chambers arranged longitudinally, and a central combustion chamber formed along the axial portion and communicating the disk-like combustion chambers. Each of the disk-like combustion chambers is provided with a plurality of oxidizer injection nozzles at its inner circumference surface. Inside the disk-like combustion chambers, the oxidizer is injected in nearly the tangent directions of the circumference, and the injection directions are opposite for the neighboring disk-like combustion chambers, which creates vortical flows with opposite rotating directions so as to increase the total residence time of the combustion reactions of the oxidizer and the solid-state fuel in the disk-like combustion chambers of the present invention.

16 Claims, 4 Drawing Sheets

DUAL-VORTICAL-FLOW HYBRID ROCKET ENGINE

BACKGROUND OF THE INVENTION

1. Field of the Invention

The present invention relates to the field of aerospace technology, and more particularly to a dual-vortical-flow hybrid rocket engine.

2. Description of Related Art

The traditional dual-vortical-flow hybrid rocket engine uses a single flow channel or multiple flow channels and uses an axial fluid or gas oxidizer injection. With reference to FIG. 1, it shows a schematic drawing of the conventional hybrid rocket engine. A housing 3' forms with a main body 1' and an injection port 2'. The main body 1' disposes with a solid-state fuel 4'. When the rocket engine starts, it injects the oxidizer from the oxidizer injection nozzle 7' and the oxidizer flow through the solid-state fuel 4' at a combustion channel, melts with the solid-state fuel, burns with mixing, and ejects from the nozzle 2' to produce a thrust. By the above design, the vacuum specific impulse is about 250 seconds, which is below its ideal value of more than 300 seconds. The main reason for the low performance is the diffusion flame structure, which causes low mixing and low combustion efficiency. To improve such rocket engine, it requires increasing the combustion channel, which will increase the volume and weight of the rocket and increase the cost.

SUMMARY OF THE INVENTION

The main object of the present invention is to provide a new structure dual-vortical flow hybrid rocket engine to generate high combustion efficiency and improve the performance in an existing volume and weight.

In order to solve the foregoing technology problems, the present invention provides a dual-vortical-flow rocket engine comprising: a main body having: a plurality of disk-like combustion chambers arranged longitudinally; a central combustion chamber communicating with an axial portion of each disk-like combustion chamber; and a plurality of oxidizer injection nozzles disposed at an inner circumference surface of each disk-like combustion chamber; and a nozzle connected at an end of the main body.

Wherein, each oxidizer injection nozzle and a tangent line of the circumference surface of each disk-like combustion chamber form a 10~20 degree angle such that an oxidizer injects into each disk-like combustion chamber with the 10~20 degree angles measured from the tangent directions of the circumference surface of each disk-like combustion chamber.

Wherein, the number of the disk-like combustion chambers is even.

Wherein, the number of the disk-like combustion chambers is two.

Wherein, two rotating directions of the oxidizer injected into the disk-like combustion chambers are opposite.

Wherein, the number of the oxidizer injection nozzles disposed at the inner circumference surface of each disk-like combustion chamber is even and the oxidizer injection nozzles dispose symmetrically.

Wherein, the number of the oxidizer injection nozzles disposed at the inner circumference surface of each disk-like combustion chamber is at least four.

Wherein, the number of the oxidizer injection nozzles disposed at the inner circumference surface of each disk-like combustion chamber is four, six, or eight.

The beneficial effects of the present invention are: Inside the disk-like combustion chambers, the oxidizer is injected in nearly the tangent directions of the circumference, and the injection directions are opposite for the neighboring disk-like combustion chambers, which creates vortical flows with opposite rotating directions so as to increase the total residence time of the combustion reactions of the oxidizer and the solid-state fuel in the disk-like combustion chambers of the present invention. With the rotating propellant flows come into the central combustion chamber and turn a 90 degree angle into the axial direction, generating maximum fluid shear stresses due to flow turning and the counter rotating flows from the disk-like chambers, and resulting in the best mixing and combustion effects of the propellants in the central combustion chamber, and is ejected through the convergent and divergent nozzle. In such manner, the dual-vortical-flow hybrid rocket engine has significantly improved its overall combustion efficiency and the propulsion performance, finally reaches a near-ideal combustion and propulsion efficiency, meanwhile significantly shorten the length of the rocket engine.

DETAILED DESCRIPTION OF THE PREFERRED EMBODIMENT

The following content combines with the drawings and the embodiment for describing the present invention in detail.

Figure 1:
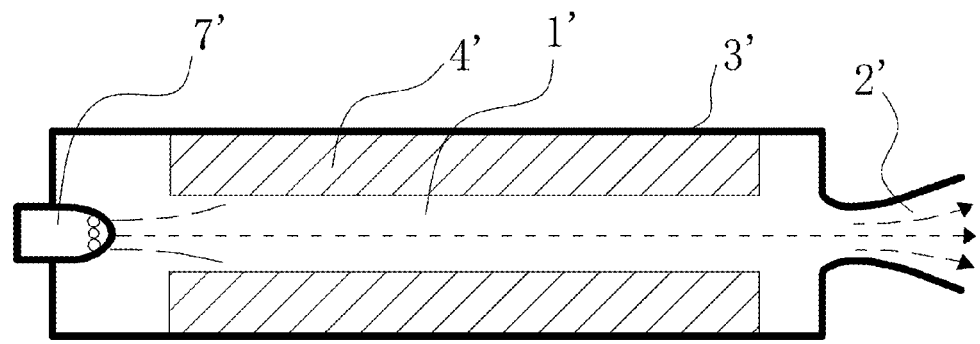
FIG. 1 is a schematic drawing of the conventional hybrid rocket engine.
Figure 2:
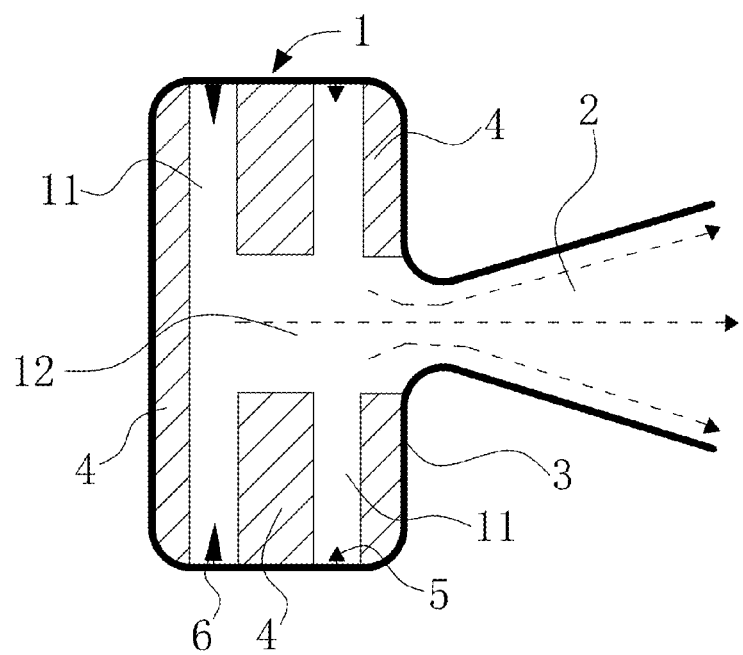
FIG. 2 is a schematic drawing of a dual-vortical-flow rocket engine according to the present invention.

FIG. 1 is a schematic drawing of the conventional hybrid rocket engine, and FIG. 2 is a schematic drawing of a dual-vortical-flow rocket engine according to the present invention. The dual-vortical-flow rocket engine of the present invention includes a main body 1 and a nozzle 2 connected at an end of the main body 1. The main body 1 includes a plurality of disk-like combustion chambers 11 arranged longitudinally and includes a central combustion chamber 12 communicating axial portions of combustion chambers 11. Each disk-like combustion chamber 11 is a circular-disc shape. The inner circumference surface is provided with a plurality of oxidizer injection nozzles (not shown). As a preferred embodiment, each oxidizer injection nozzle and a tangent line of the circumference surface of each disk-like combustion chamber form a 10~20 degree angle such that an oxidizer injects into each disk-like combustion chamber with the 10~20 degree angles measured from the tangent directions of the circumference surface of each disk-like combustion chamber.

Figure 3:
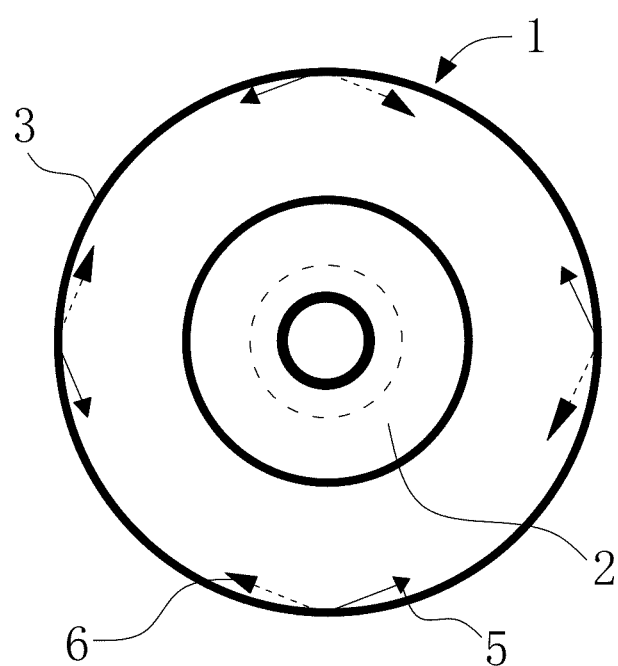
FIG. 3 is a schematic drawing of the dual-vortical-flow rocket engine at another viewing angle according to the present invention.

The number of the disk-like combustion chambers 11 is preferably even. Optimally, the number of the disk-like combustion chambers is two. It should be noted that in the present invention, the injection directions of the oxidizer are opposite for the neighboring disk-like combustion chambers 11 such that the oxidizer respectively form a clockwise vortical flow and a counterclockwise vortical flow at the neighboring disk-like combustion chambers 11. When the number of the disk-like combustion chambers 11 is two, by using the above method to inject the oxidizer, the rotating directions of the oxidizer are opposite. In FIG. 2 and FIG. 3, an arrow with equilateral triangle represents the oxidizer vortical flow 5 which is rotating in a counter clockwise direction, and an arrow with isosceles triangle represents the oxidizer vortical flow 6 which is rotating in a clockwise direction.

The present invention uses paired disk-like combustion chambers with dual-vortical-flow design, which includes the disk-like combustion chambers 11, the central combustion chamber 12 and the nozzle 2 all formed in the housing 3. It injects the oxidizer at two opposite directions near the tangential lines of the circumference surface. The oxidizer swirls in the disk-like combustion chambers 11, and a stroke of the oxidizer is increased exponentially such that it can increase a total residence time of burning near the surface of solid-state fuel 4. When the oxidizer swirls through the central combustion chamber 12 and turns 90 degrees to the central combustion chamber 12, the oxidizer vortical flows which operate in the opposite directions meet at the central combustion chamber 12. The swirling torque cancels out exactly. Through the turning and the cancelation of the swirling torque, it can generate strong fluid stress to achieve the effects of fully mixing gain and complete combustion. Therefore, it can achieve ideal combustion and propulsion efficiency and the length of the engine of the present invention can be significantly shortened.

As a preferred embodiment, the number of the oxidizer injection nozzles at the inner circumference surface of each disk-like combustion chamber 11 should be even, and disposed symmetrically to avoid uneven stress. Preferably, the inner circumference surface of each disk-like combustion chamber 11 provides with at least four oxidizer injection nozzles. Optimally, the inner circumferential surface of each disk-like combustion chamber 11 provides with four, six or eight oxidizer injection nozzles.

Figure 4:
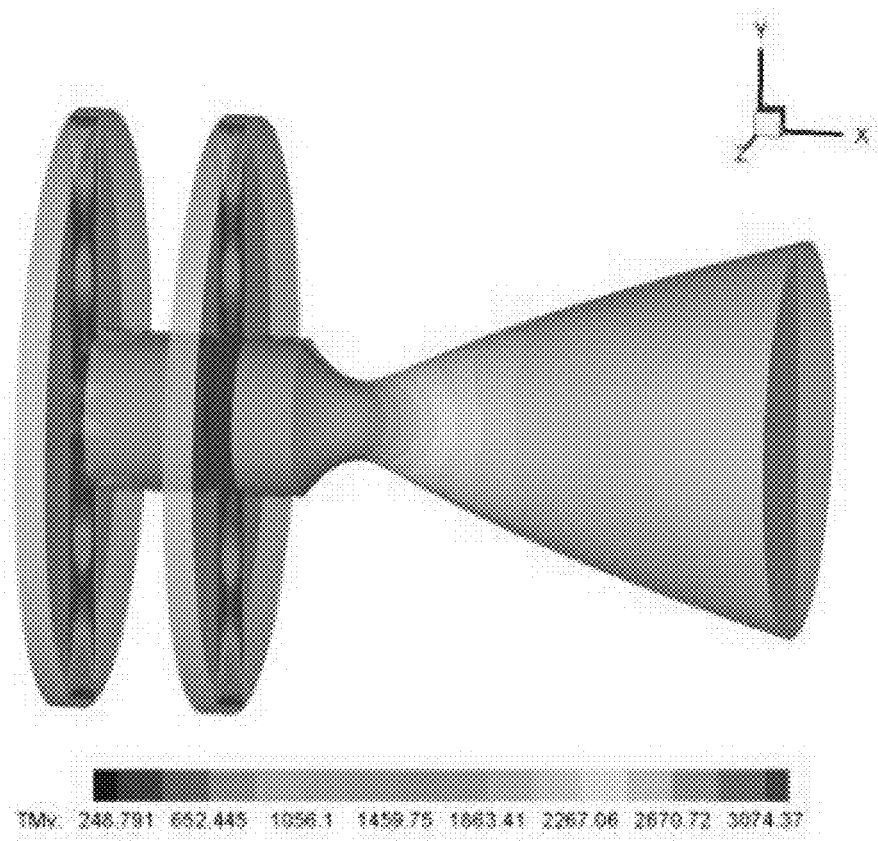
FIG. 4 is a reference drawing of simulation data of the dual-vortical-flow rocket engine according to the present invention.
Figure 5:
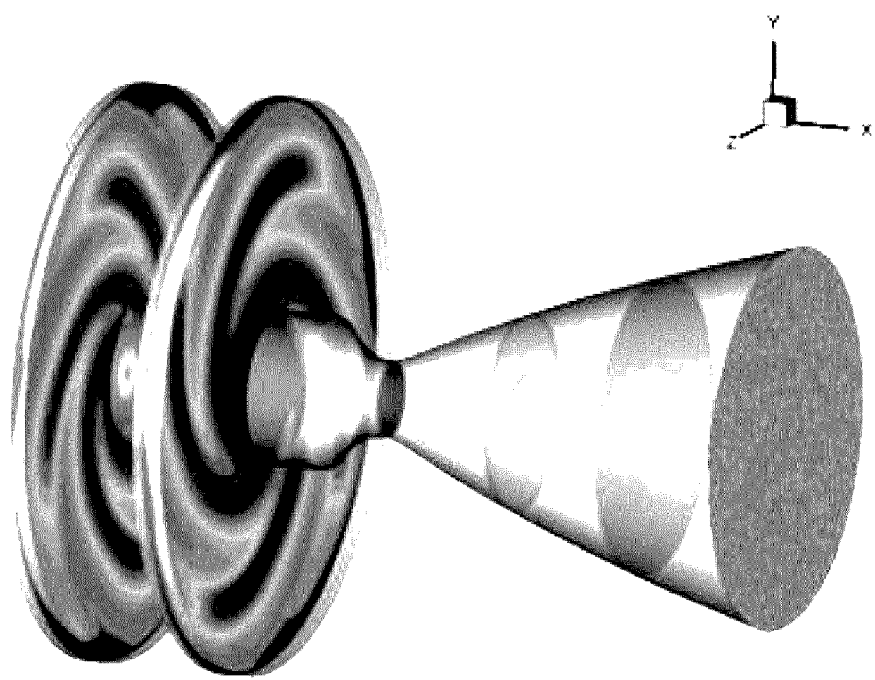
FIG. 5 is another reference drawing of simulation data of the dual-vortical-flow rocket engine according to the present invention.

With reference to FIG. 4 and FIG. 5, in order to verify the technical effects of the present invention, the inventor uses professional computing software, UNIC-UNS, which is award-winning at NASA to perform detailed calculation and analysis. When a fuel combination is $N_2O$ (as the oxidizer) and HTPB (as solid-state fuel), the calculation result for vacuum specific impulse is 292 seconds. When applying the present invention in the aviation, space and power products, it will enhance its overall average performance above 20% to 40%.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A dual-vortical-flow rocket engine comprising:
    a main body having:
        a plurality of disk-like combustion chambers arranged longitudinally;
        a central combustion chamber communicating with an axial portion of each disk-like combustion chamber; and
        a plurality of oxidizer injection nozzles disposed at an inner circumference surface of each disk-like combustion chamber, wherein the plurality of oxidizer injection nozzles of one of the plurality of disk-like combustion chambers face toward a clockwise direction of the inner circumference surface of the one the plurality of disk-like combustion chambers, and the plurality of oxidizer injection nozzles of another one of the plurality of disk-like combustion chambers face toward a counterclockwise direction of the inner circumference surface of the another one the plurality of disk-like combustion chambers, such that a rotating direction of the oxidizer injected into the one of the plurality of disk-like combustion chambers is clockwise, and a rotating direction of the oxidizer injected into the another one of the plurality of disk-like combustion chambers is counterclockwise, wherein the one the plurality of disk-like combustion chambers and the another one of the plurality of disk-like combustion chambers are two immediately adjacent disk-like combustion chambers; and
    a nozzle connected at an end of the main body.

2. The dual-vortical-flow rocket engine as claim 1, wherein, each oxidizer injection nozzle and a corresponding tangent line of the circumference surface of each disk-like combustion chamber form a 10~20 degree angle such that an oxidizer injects into each disk-like combustion chamber with the 10~20 degree angles measured from the corresponding tangent line of the circumference surface of each disk-like combustion chamber.

3. The dual-vortical-flow rocket engine as claim 2, wherein, the number of the disk-like combustion chambers is even.

4. The dual-vortical-flow rocket engine as claim 3, wherein, the number of the disk-like combustion chambers is two.

5. The dual-vortical-flow rocket engine as claim 1, wherein, the number of the oxidizer injection nozzles disposed at the inner circumference surface of each disk-like combustion chamber is even and the oxidizer injection nozzles disposes symmetrically.

6. The dual-vortical-flow rocket engine as claim 2, wherein, the number of the oxidizer injection nozzles disposed at the inner circumference surface of each disk-like combustion chamber is even and the oxidizer injection nozzles disposes symmetrically.

7. The dual-vortical-flow rocket engine as claim 3, wherein, the number of the oxidizer injection nozzles disposed at the inner circumference surface of each disk-like combustion chamber is even and the oxidizer injection nozzles disposes symmetrically.

8. The dual-vortical-flow rocket engine as claim 4, wherein, the number of the oxidizer injection nozzles disposed at the inner circumference surface of each disk-like combustion chamber is even and the oxidizer injection nozzles disposes symmetrically.

9. The dual-vortical-flow rocket engine as claim 5, wherein, the number of the oxidizer injection nozzles disposed at the inner circumference surface of each disk-like combustion chamber is at least four.

10. The dual-vortical-flow rocket engine as claim 6, wherein, the number of the oxidizer injection nozzles disposed at the inner circumference surface of each disk-like combustion chamber is at least four.

11. The dual-vortical-flow rocket engine as claim 7, wherein, the number of the oxidizer injection nozzles disposed at the inner circumference surface of each disk-like combustion chamber is at least four.

12. The dual-vortical-flow rocket engine as claim 8, wherein, the number of the oxidizer injection nozzles disposed at the inner circumference surface of each disk-like combustion chamber is at least four.

13. The dual-vortical-flow rocket engine as claim 9, wherein, the number of the oxidizer injection nozzles disposed at the inner circumference surface of each disk-like combustion chamber is four, six, or eight.

14. The dual-vortical-flow rocket engine as claim 10, wherein, the number of the oxidizer injection nozzles disposed at the inner circumference surface of each disk-like combustion chamber is four, six, or eight.

15. The dual-vortical-flow rocket engine as claim 11, wherein, the number of the oxidizer injection nozzles disposed at the inner circumference surface of each disk-like combustion chamber is four, six, or eight.

16. The dual-vortical-flow rocket engine as claim 12, wherein, the number of the oxidizer injection nozzles disposed at the inner circumference surface of each disk-like combustion chamber is four, six, or eight.

* * * * *